United States Patent [19]
Patrin

[11] 3,741,581
[45] June 26, 1973

[54] SUSPENSION AND STEERING APPARATUS FOR VEHICLES

[75] Inventor: Arthur J. Patrin, Frederic, Wis.

[73] Assignee: David W. Florence and Helen Patrin, Frederic, Wis., a part interest to each

[22] Filed: May 21, 1970

[21] Appl. No.: 39,481

[52] U.S. Cl............... 280/96.2 R, 267/34, 188/316
[51] Int. Cl.......................... B60g 3/00, B60g 11/14
[58] Field of Search................ 280/96.2, 96, 124 B, 280/124 F; 267/34, 60; 188/318, 316

[56] References Cited
UNITED STATES PATENTS

| 3,346,272 | 10/1967 | Smith | 280/96.2 R |
| 1,991,777 | 2/1935 | Vaughn | 280/96.2 |
| 1,468,652 | 9/1923 | Storey | 188/318 |
| 2,681,044 | 6/1954 | Eggenberger | 188/318 |
| 2,220,254 | 11/1940 | Maier | 280/96.2 |
| 2,310,821 | 2/1943 | Wimbish | 280/96.2 |

Primary Examiner—Kenneth H. Betts
Attorney—Williamson, Palmatier & Bains

[57] ABSTRACT

A vertically disposed spindle shaft rotatably supported within a hydraulic cylinder is utilized to transmit turning movements to the wheel of a vehicle by means of a gear train including a plurality of bevel gears driven by a bevel pinion on a vehicle steering column. A piston positioned transversely within the hydraulic cylinder on the aforesaid spindle shaft and vertically movable within the hydraulic cylinder with the spindle shaft acts as a shock absorbing device and further serves as a support means for a main suspension coil spring contained within said cylinder, the spindle shaft being rotatably supported at the opposite ends of said cylinder as well as by said piston. Two different sets of flow passages in said piston of different cross-sectional areas cause said piston and spindle to move downwardly relative to said cylinder at a slower rate than they move upwardly to give the desired shock absorbing effect, and a valve controlled fluid conduit connecting the upper and lower ends of said hydraulic cylinder on opposite sides of said piston permits the adjustment of the shock absorber device to give the desired performance for a particular vehicle size and weight load. A threaded yoke connection of the aforesaid spindle shaft to a wheel hub permits the rotary adjustment of the wheel on the spindle for proper toe-in and wheel alignment, and final wheel alignment of both front wheels relative to a vehicle is accomplished by the rotatably adjustable mounting of the aforesaid hydraulic cylinder on a mounting block utilized for attaching the hydraulic cylinder to a vehicle frame.

14 Claims, 9 Drawing Figures

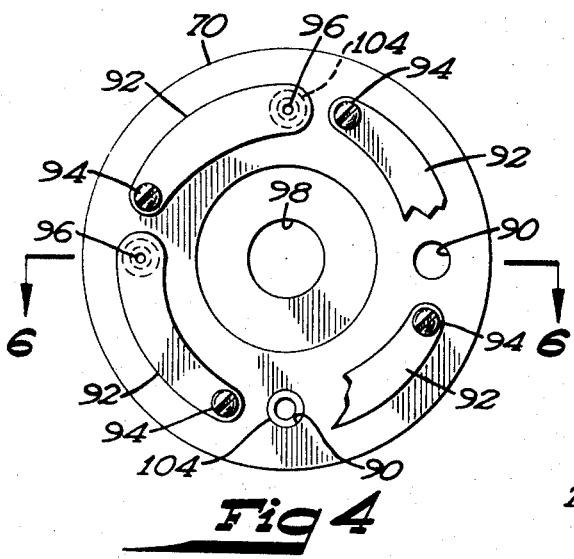
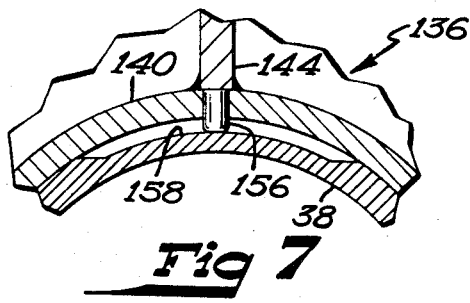
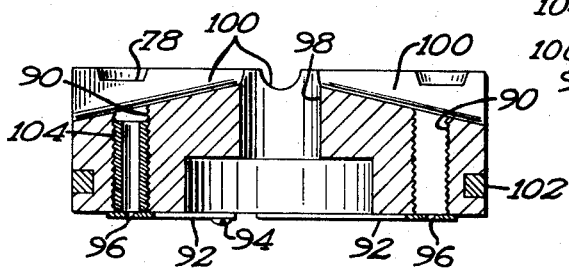
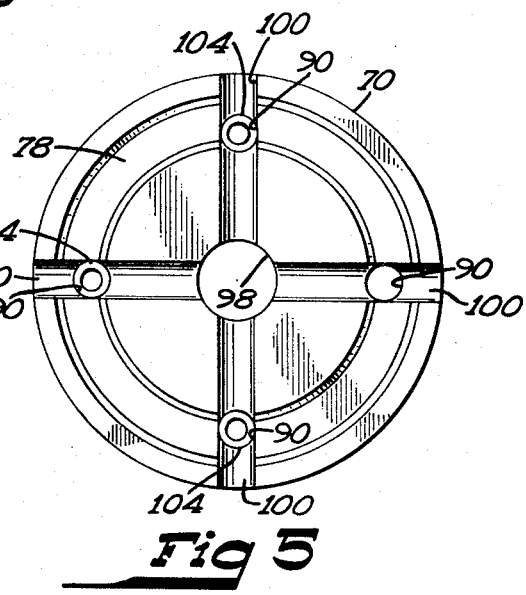
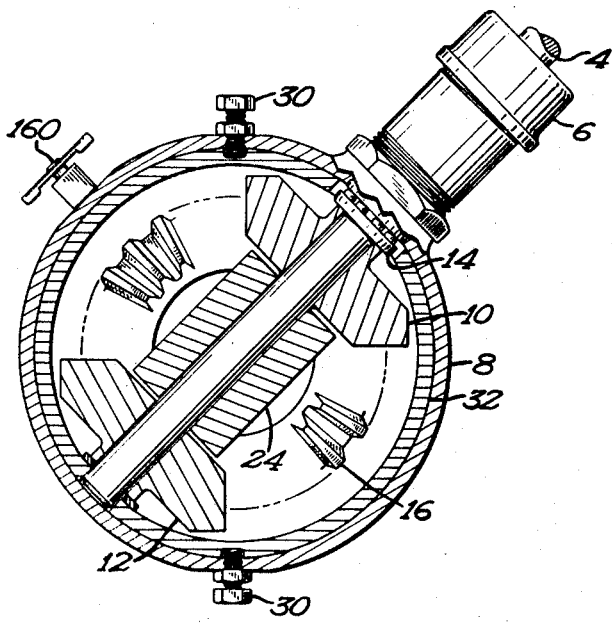
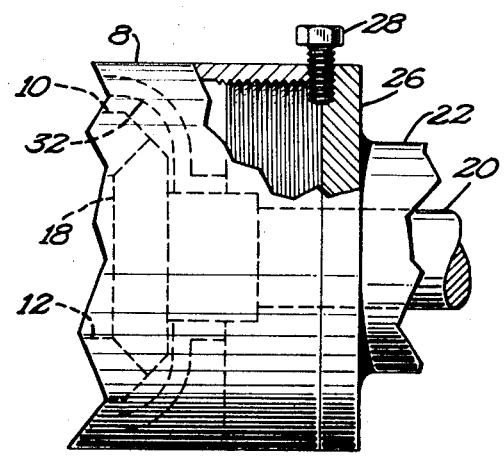

3,741,581

SUSPENSION AND STEERING APPARATUS FOR VEHICLES

BRIEF SUMMARY OF THE INVENTION

The vehicle steering and suspension apparatus of this invention is particularly characterized by a gear train steering arrangement in combination with a unique and highly effective hydraulic shock absorber comprised of a hydraulic cylinder and piston assembly through which a wheel turning spindle extends, the spindle being driven by the aforesaid gear train and rotatably supported at spaced points along the hydraulic cylinder. By virtue of this arrangement I am able to provide a compact steering and vehicle suspension system which eliminates the large number of parts including tie rods, king pins, etc., which characterize presently available steering mechanisms and which represent potential hazards if they should fail for any reason.

As a particularly advantageous feature of my improved shock absorber and suspension apparatus, I rotatably support the aforesaid spindle shaft within the piston of the hydraulic cylinder in such a way that the piston is vertically movable with the spindle shaft for shock absorbing purposes. Since the shock absorber piston does not rotate with the wheel spindle, the piston and a heavy compression spring extending between said piston and the top wall of the hydraulic cylinder do not resist or interfere with the rotational movement of the wheel spindle for steering purposes. This arrangement also eliminates the need for providing rotary seals between the piston and the hydraulic cylinder wall and a contact bearing to rotatably support the aforesaid compression spring at the top of the hydraulic cylinder.

The flow of hydraulic fluid back and forth through said piston as said piston and spindle move vertically with respect to the hydraulic cylinder is regulated by flow passages of different cross-sectional areas which cause the piston and spindle to move downwardly at a slower rate than they move upwardly. In the preferred embodiment of my invention, reed valves control the downward flow of fluid through relatively large passages in the piston, and permanent apertures of considerably smaller cross-sectional area in the reed valves in alignment with the aforesaid passages provide for the return flow of hydraulic fluid upwardly through the piston.

As a particularly beneficial aspect of my shock absorber, I provide a flow conduit connecting the top and bottom of the hydraulic cylinder on opposite sides of the aforesaid piston and utilize an adjustable valve in the flow conduit to regulate the rate of fluid flow from the bottom to the top of the hydraulic cylinder to achieve the necessary and proper shock absorbing effect for vehicles having different weight loads.

The aforesaid spindle shaft extends downwardly through the bottom wall of the hydraulic cylinder and has a threaded base member which is received in threaded with a wheel mounting yoke, the yoke being rotatably adjustable on the threaded base member of said spindle to properly align the wheel attached thereto. Further, final alignment of both front wheels of a vehicle utilizing the aforesaid suspension and steering system is achieved by utilizing upright mounting blocks having arcuate portions to receive the cylinders and mount them on a vehicle frame, the hydraulic cylinders being rotatably adjustable about their vertical axes in the arcuate wall portions of the mounting blocks and secured thereby against vertical displacement by horizontal pins extending outwardly from the mounting block and received within horizontally disposed, arcuate slots in the side walls of the hydraulic cylinders.

As a further advantageous feature of my suspension and steering apparatus, I provide a rotatably adjustable gear box or housing for the steering pinion on a vehicle steering column and driven bevel gears mounted on horizontally extending steering shafts extending outwardly to drive bevel gears mounted on the top of the aforesaid spindle shafts, the rotatable adjustment of the gear housing being accomplished by threaded connections between the main housing and the end walls thereof defined by elongated housings enclosing the aforesaid horizontally extending steering shafts.

These and other objects and advantages of my invention will become readily apparent as the following description is read in conjunction with the accompanying drawings wherein like reference numerals have been used to designate like elements throughout the several views.

BRIEF DESCRIPTION OF THE DRAWINGS

FIG. 3 is a perspective view on an enlarged scale showing the adjustable connection of the spindle shaft to a wheel assembly;

FIG. 4 is a horizontal section view taken along lines 4—4 of FIG. 2 and showing the bottom face of the hydraulic piston;

FIG. 5 is a horizontal section view taken along lines 5—5 of FIG. 2 through the hydraulic cylinder;

FIG. 6 is a vertical section view of the hydraulic piston taken along lines 6—6 of FIG. 4;

FIG. 7 is a horizontal section view taken along lines 7—7 of FIG. 2 and showing the mounting and locating pin connection of the hydraulic cylinder to its mounting block;

FIG. 8 is a section view through the steering gear housing taken along line 8—8 of FIG. 1; and FIG. 9 is a section view taken along lines 9—9 of FIG. 8 and showing a portion of the steering gear housing.

DESCRIPTION OF THE PREFERRED EMBODIMENT

Figure 1:
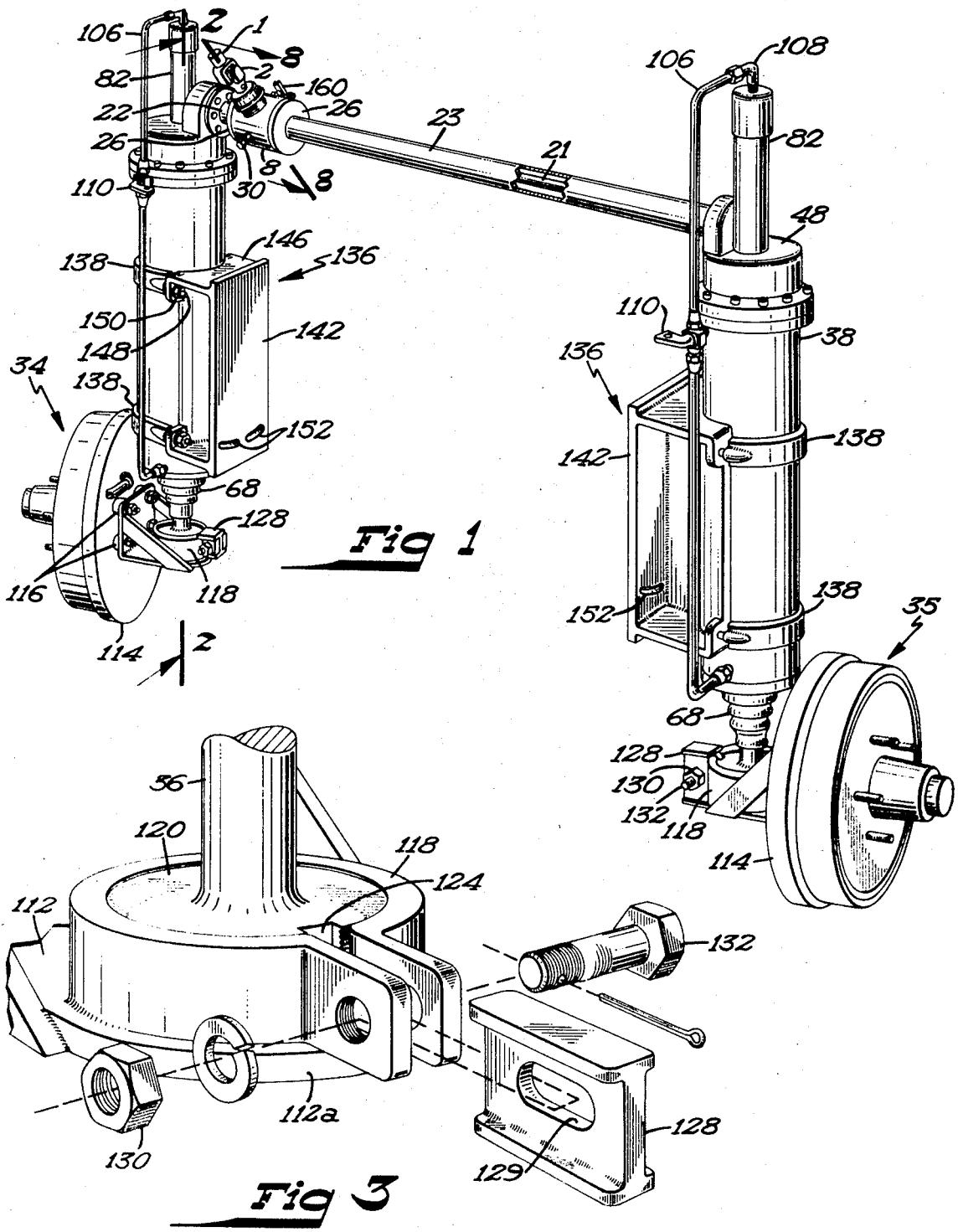
FIG. 1 is a perspective view of my combined steering gear and suspension apparatus for a vehicle.

Referring now to the drawings, I have shown in FIG. 1 a perspective view of my improved steering and suspension apparatus for the front end of a vehicle. For the purpose of providing smooth, responsive steering of the front wheels of a vehicle, I utilize a steering gear arrangement in contrast with the tie rod and king pin steering mechanism conventionally employed on automotive vehicles. Steering column 1 extending from the steering wheel (not shown) of a vehicle is connected by means of a universal joint 2 to a turning shaft 4 extending through an oil seal 6 into a gear box or housing 8, the structure of gear box 8 and the gear arrangement therein being most clearly shown in FIGS. 8 and 9. Turning shaft 4 preferably extends all of the way to the back wall of gear box 8 and has a bevel steering pinion 10 and an idler bevel gear 12 mounted thereon for rotation therewith. Turning shaft 4 is rotatably supported in gear box 8 by ball bearing 14. Meshing with steering pinion 10 in driven engagement therewith are a pair of bevel gears 16 and 18 mounted on horizontally extending steering shafts 20 and 21 rotatably supported within elongated housings 22 and 23. Idler gear 12 serves to prevent rotational slippage or play of steering pinion 10 and gears 16 and 18 with respect to each other, and spacer block 24 through which turning shaft 4 extends limits end play of all four gears 10, 12, 16 and 18. Each of the steering shaft housings 22 and 23 terminates at its inner end at a threaded end cap 26 which serve to close the opposed ends of gear housing 8, and which are threadedly engaged with internal threads on gear housing 8 in the manner shown in FIG. 9. Gear housing 8 is held in the desired position of rotational adjustment on threaded end caps 26 by means of lock screws 28. A second set of lock screws 30 extend through gear housing 8 on opposite sides thereof and bear against an inner gear casing 32, thereby serving to hold outer gear housing 8 and inner casing 32 in the desired relative position with respect to each other.

By reason of the threaded, rotational assembly of gear housing 8 to threaded end caps 26, housing 8 may be rotatably adjusted on end caps 26 by loosening locking screws 28 and 30. This feature is particularly useful for changing the angular orientation of turning shaft 4 and steering column 1 to provide for right hand rather than left hand steering on a vehicle, such as on certain foreign cars. It will thus be appreciated that by rotating gear housing 8 through a 90° arc with respect to threaded end caps 26, turning shaft 4 can be angularly oriented for attachment to a steering column mounted on the right hand side of a vehicle without having to make any further modification of the steering gear and suspension assembly shown in FIG. 1.

It will be noted with respect to FIG. 1 that I have shown a pair of front wheel assemblies 34 and 35 connected to my suspension and steering gear structure. Each of these wheel assemblies is connected to a spindle shaft 36 extending through a shock absorber cylinder 38 and connected by a gear drive completing the steering gear train for turning movement by steering column 1. Since the internal structure and mounting arrangement for shock absorber cylinder 38 is identical for both sides of the steering and suspension assembly, only the left hand shock absorber and suspension structure will be described with reference to FIG. 2. Steering shaft 20 is rotatably supported at its outer end in bearing 40 housed within end cap 42 formed integrally with shaft housing 22. Mounted on the outer end of steering shaft 20 for rotation therewith is a bevel pinion 44 which drivingly engages bevel gear 46, pinion 44 and gear 46 being positioned within housing 48 attached to the upper end of shock absorber cylinder 38. Depending downwardly from bevel gear 46, and preferably formed integrally therewith, is an integrally splined tubular extension 50 which slidably receives external splined section 52 on spindle shaft 36. Provision is thereby made for the vertical displacement of spindle shaft 36 relative to cylinder 38 and bevel gear 46 by utilizing a splined type of coupling means between bevel gear 46 and spindle shaft 36. Bevel gear 46, together with its depending tubular extension 50, is rotatably supported in bearing 54 seated within top, transverse closure wall 56 for cylinder 38. Closure wall 56 is preferably in the form of a threaded end cap which may be rotatably adjusted upwardly or downwardly by reason of its threaded connection with cylinder 38 in order to vertically adjust bevel gear 46 for proper engagement with and pressure contact by bevel pinion 44. Cylinder 38 is closed at its bottom end by a transverse closure wall 58 having a sleeve bearing 60 centrally positioned therein through which the lower end of spindle shaft 36 extends. A plurality of sealing rings 62 in combination with O-rings seals 63 and 64 at the top and bottom of sleeve bearing 60 effect a liquid seal between spindle shaft 36, sleeve bearing 60 and the central, bearing aperture in cylinder bottom wall 58. Collar 66, which threadedly engages the top of cylinder bottom wall 58 functions to seat and tightly hold in place O-ring 63 and sealing ring 62. A bellows type of boot 68 serves as a dust cover and seal for the lower end of cylinder 38.

Disposed transversely within cylinder 38 is a piston 70 through which spindle shaft 36 extends. For reasons hereinafter set forth, piston 70 is carried on spindle shaft 36 in such a way that it rotatably supports shaft 36 without rotating therewith. This is accomplished by utilizing a thrust bearing in the form of a tapered roller bearing 72 on piston 70 to provide rotary support for the center portion of spindle shaft 36. Inner bearing race 74 on spindle shaft 36 serves to carry piston 70 upwardly with spindle shaft 36 as it is displaced vertically with respect to cylinder 38 to provide a shock absorbing effect. Vertically oriented within cylinder or tubular housing 38 is a main compression spring 76 which serves as a primary means for supporting the weight load of the front end of a vehicle. Spring 76 is contained between and bears against piston 70 and top closure wall 56 of cylinder 38, annular grooves 77 and 78 in closure wall 56 and the top surface of piston 70, respectively, serving to fixedly restrain and guide spring 76. Since piston 70 does not rotate with turning spindle 36, no rotary movement will be imparted to compression spring 76, and thus there is no need for a bearing at the top of spring 76 to permit rotary movement between said spring and cylinder end wall 56. For heavy duty vehicles, such as trucks and tractors, where the vehicle weight load is considerably greater than that which would be encountered on ordinary passenger cars, I provide a secondary, overload compression spring 80 which is contained within a relatively small diameter cylindrical housing 82 threadedly secured to gear housing 48 on the top of cylinder 38. In this preferred embodiment of my invention, the top end of spindle shaft 36 extends upwardly through a bearing sleeve 84 in gear housing 48 and is held in this upwardly extending position within spring housing 82 by means of a lock nut 86 threaded onto its top end and bearing against the top of bearing sleeve 84. Coil spring 80 is of relatively small diameter compared to main compression spring 76 and bears at its lower end against the top of lock nut 86. Since spring 80 will thus rotate with spindle shaft 36 as it turns, a bearing 88 is utilized at the top of spring housing 82 to rotatably support spring 80.

For shock absorbing purposes, the space within cylinder 38 above and below piston 70 is filled with a hydraulic fluid such as oil. The controlled flow of oil upwardly and downwardly through piston 70 as it moves up and down with spindle shaft 36 relative to cylinder 38 is accomplished by flow passages of predetermined cross-sectional area, the arrangement of which may be best understood by reference to FIGS. 4, 5 and 6. A first plurality of flow passages 90 of relatively large cross-sectional area extend from the top to the bottom surface of piston 70. The downward flow of oil through flow passages 90 is controlled by a plurality of reed valves 92 flexibly and resiliently affixed to the underside of piston 70 by fasteners 94, about which valves 92 in alignment with flow passages 90, ports 96 being permanently open. The relatively small cross-sectional area of ports 96 relative to flow passages 90 insures that the upward flow of oil through piston 70 upon its downward movement will be relatively slow in comparison to the flow rate through passages 90. As may be noted with reference to the top view of piston 70 shown in FIG. 5, annular spring retention groove 78 is spaced outwardly from central opening 98 through which spindle shaft 36 extends, and a plurality of radially extending grooves 100 slope downwardly from the center of piston 70 to flow passages 90 to assist in directing oil into these passages. A sealing ring 102 seated in a slot in the peripheral surface of piston 70 serves to prevent the leakage of oil past the outer periphery of piston 70 along the inside surface of cylinder 38. Since piston 70 is only subjected to longitudinal, reciprocal movement with respect to cylinder 38, and does not rotate therein, seal 102 can be a conventional seal ring.

As I indicated in FIG. 6, the diameter of flow passages 90 may be adjusted to some extent by providing internal threads in these passages and utilizing threaded reducing fittings 104 therein to reduce the diameter of passages 90.

In operation on a vehicle, the combination of piston 70 and compression spring 76 in hydraulic cylinder 38 serves to provide a very effective suspension and shock absorbing arrangement. Spindle 36, being connected to wheel assembly 34 by means hereinafter described, will move upwardly and downwardly within splined extension 50 of bevel gear 46 relative to cylinder 38 as wheel assembly 34 traverses bumps and uneven terrain. As spindle shaft 36 shifts upwardly, it will carry piston 70 upwardly with it, thereby compressing spring 76 and forcing oil from the top space within cylinder 38 downwardly through flow passages 90, reed valves 92 being forced open by the oil pressure. Because of the relatively small cross-sectional area of return ports 96 relative to flow passages 90, much greater resistance will be offered to the return flow of oil upwardly through piston 70 to the space thereabove. Thus, piston 70 and spindle 36 will move downwardly under the recoil of compression spring 76 much more slowly then they move upwardly, thereby providing a very effective shock absorbing function. The slow, downward recoil of piston 70 and spindle shaft 36 insures that there will be a minimum recoil and vibration effect transmitted through the steering column to the steering wheel and the driver's wrists. This benefit is particularly important on trucks and heavy equipment where the recoil shock and vibration transmitted to a driver's wrists and arms when driving a heavy vehicle over rough terrain can otherwise be very fatiguing. Because of the substantial benefits to be realized from my shock absorber and suspension structure, I anticipate that it will find utility on the rear wheels as well as on the front wheels of vehicles.

In order to further regulate the shock absorbing effect provided by my hydraulic shock absorber, I provide a flow conduit 106 which connects the space within cylinder 38 under piston 70 with the upper space in cylinder 38 above piston 70. In the preferred embodiment of my invention, tubular conduit 106 is connect to a fitting 108 attached to the top of small spring housing 82 at the top of cylinder 38. Oil forced upwardly through conduit 106 by the downward movement of piston 70 will flow downwardly through small cylinder 82 and then along spindle shaft 36 through bearings 84 and 54 into the upper end of cylinder 38. In order to regulate the flow of oil through conduit 106, I provide an adjustable flow control valve 110 therein. With control valve 110 fully open, there will be a minimum shock absorbing effect achieved by the oil under piston 70 under the recoil of spring 76. With valve 110 fully open, there will be relatively little resistance to the flow of oil through conduit 106 upwardly into the top of cylinder 38 as piston 70 moves downwardly. Thus, with this relatively unrestricted recirculation of oil from the bottom to the top end of cylinder 38 supplementing the restricted flow of oil through return ports 96, there will be a minimum oil cushion under piston 70 for shock absorbing purposes. The necessary and proper shock absorbing effect for vehicles having different weight loads can be achieved by adjusting control valve 110 from a fully open towards a fully closed position. With valve 110 fully closed, a maximum shock absorbing function will be achieved with the only oil flow from the bottom to the top of cylinder 38 taking place through restricted ports 96.

Figure 2:
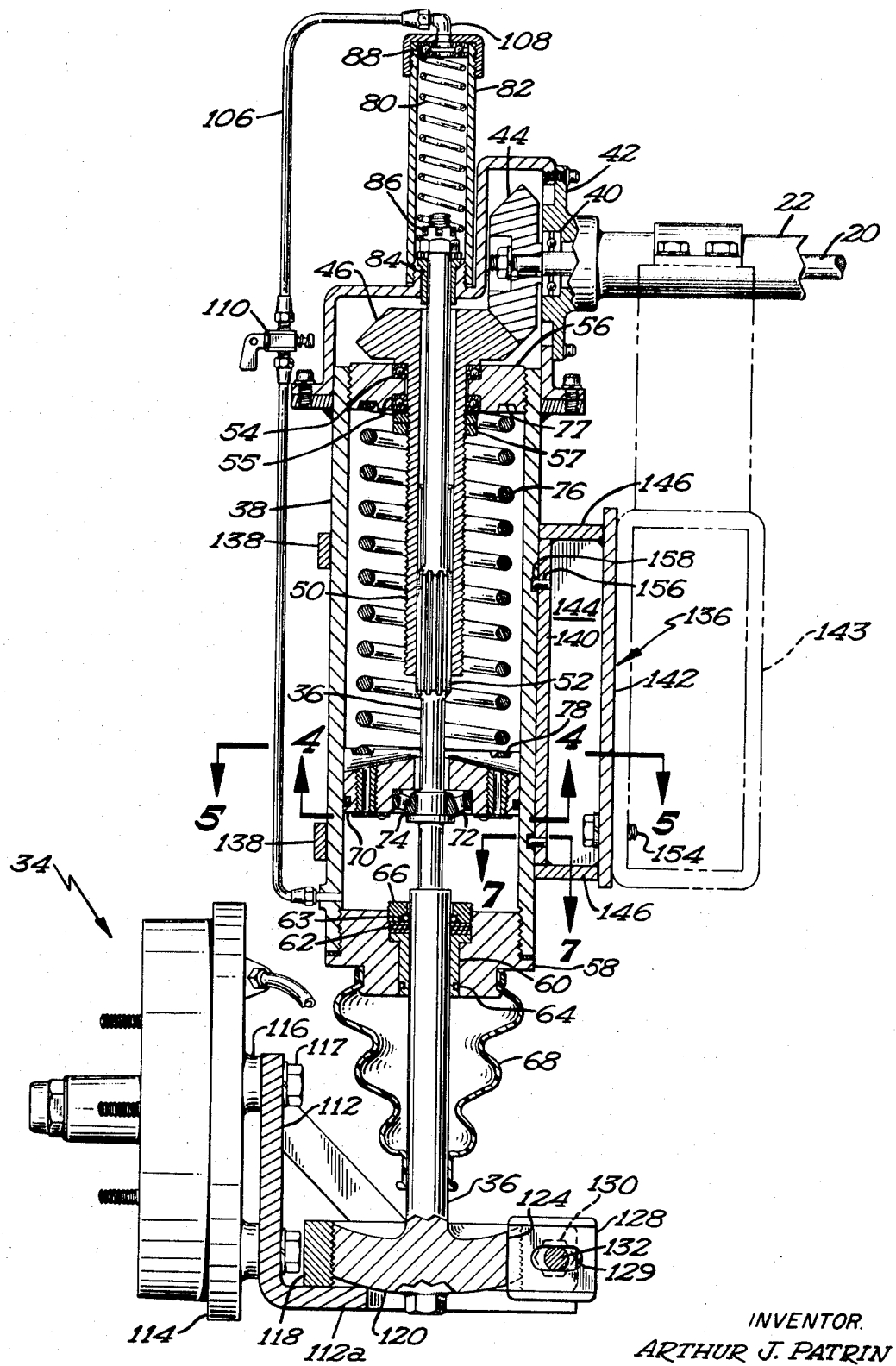
FIG. 2 is a vertical section view taken along lines 2—2 of FIG. 1 and showing the internal structure of the hydraulic shock absorber cylinder and spindle shaft assembly.

The connecting means for securing the lower end of spindle shaft 36 to wheel assembly 34 is shown most clearly in FIGS. 1, 2 and 3. A right angle bracket 112 is fastened to wheel hub 114, nuts 117 being utilized to hold bracket 112 on studs 116. Welded to the top face of horizontally extending portion 112a of bracket 112 is a circular yoke 118 which is internally threaded, and receives threaded base member 120 on the bottom end of spindle shaft 36 in threaded engagement therewith. Base member 120 is preferably formed integrally with the lower end of shaft 36, and a weld nut 122 is secured to the bottom face of member 120 to serve as a wrench connection between spindle 36 and yoke 118. Yoke 118 is rotatably adjusted on threaded base member 120 until the wheel mounted on hub 114 is brought to the proper position of alignment and toe-in. The camber of wheel hub 114 is fixed and predetermined by the angle of hub mounting bracket 112. After yoke 118 is rotatably adjusted to the desired position of wheel alignment on threaded base member 120 of spindle 36, a vertical slot 124 is formed in the peripheral surface of base member 120 in alignment with the opening between apertured flanges 126 and 127 defining an open side on yoke 118. Locking plate 128 is then inserted between outwardly extending flanges 127 with its inner, upright edge seated within slot or notch 124. Locking plate 128 has a central, elongated aperture 129 therein, and is preferably H-shaped with its upper and bottom walls bearing on the top and bottom surfaces of flanges 126 and 127. Flanges 126 and 127 are then drawn tightly together against locking plate 128 by tightening nut 130 on the threaded end of bolt 132 inserted through aligned apertures in flanges 126 and 127 and locking plate 128. Cotter pin 134 inserted through bolt 132 insures that it will not slip out of place. The firm engagement of locking plate 128 in slot 124 of base member 120 between flanges 126 and 127 insures that there will be no undesired relative turning movement between yoke 118 and base member 120 which would permit the wheel assembly to be rotated out of desired alignment.

Upright cylinders 38 are rigidly mounted on side beams of the frame of a vehicle by means of mounting blocks 136 removably secured to cylinders 38 by means of a pair of brackets 138. Each of the mounting blocks 136 is comprised of an upright, arcuate or concave portion 140 within which cylinder 38 is seated, a vertical plate 142 adapted to bear against the side of a beam 143 (FIG. 2) forming a portion of the chassis frame of a vehicle, and a vertical web 144 welded between arcuate portion 140 and vertical plate 142. Top and bottom plates 146 of mounting blocks 136 are also welded to wall portions 140 and 142 and include depending flange segments to which threaded studs projecting from mounting brackets 138 are secured by nuts 150. As may be noted by reference to FIGS. 1 and 2, a plurality of cap screws or bolts 154 are inserted through openings 152 in upright plate 142 and utilized for securing mounting blocks 136 to the side beams 142 of a vehicle chassis. Openings 152 in vertical plate 142 are preferably of arcuate shape and extend in a horizontal direction, whereby the entire suspension assembly comprised of the horizontal steering shafts 20, 21 cylinders 38 and wheel assemblies 34 and 35 as well as mounting blocks 136 may be pivoted with cylinders 38 swinging in a vertical plane about a horizontal axis defined by shafts 20, 21 to bring cylinders 38 and wheel spindles 36 to a perfectly upright position. It will be appreciated that any deviation of cylinders 38 and spindle shafts 36 from an absolutely vertical position would undesirably change the present camber of wheel hub 114 with respect to the ground.

It is also to be noted that upright, arcuate wall portion 140 of mounting block 136 is provided with a pair of retention and locating pins 156 rigidly secured thereto and projecting horizontally outwardly therefrom at its upper and lower ends. Pins 156 are received within arcuate slots 158 extending a short distance around the peripheral surface of cylinder 38 at the upper and lower ends thereof in horizontal planes. The engagement of pins 156 within arcuate slots 158 prevents undesired vertical displacement of cylinder 38 within mounting brackets 138. If the opposed side beams 143 of a vehicle chassis are not in proper, parallel alignment with each other, adjustment of cylinders 38 may be made in order to maintain opposed wheel assemblies 34 and 35 in proper alignment with each other in the position at which they are assembled and mounted on the steering and suspension assembly shown in FIG. 1. This is accomplished by loosening retention nuts 150 from bracket studs 148 and thereby loosening cylinder retention brackets 138 so that mounting block 136 may be rotated about cylinder 38 with pins 156 following within arcuate slots 158 until inner, upright plate 142 is flush against the face of the adjacent chassis beam 143. This adjustment of mounting plates 136 is of course made possible by the use of arcuate wall portion 140 thereon to receive cylinder 38. After the aforesaid adjusting of mounting block 136 has been accomplished, brackets 138 are again tightly secured about cylinder 38 by tightening nuts 150 on studs 148.

The various moving parts of the gear train steering mechanism, including rotatable steering spindle 36 and its bearings operate in an oil lubricant. Gear housing 8 is provided with a filler plug 160 through which oil may be introduced into housing 8, and elongated steering shaft housings 22 and 23 provide conduits through which oil may be circulated from gear housing 8 into cylinders 38 to lubricate the gears and bearings operating therein.

Those skilled in the art will appreciate that the steering gear and shock absorber arrangement disclosed herein provides a compact, highly effective means for transmitting steering movement to the wheels of a vehicle through a gear train utilizing a rotatable spindle which forms part of a compact shock absorber and suspension assembly. Driving safety is greatly enhanced in comparison with conventional steering arrangements because even if a blow-out occurs in one front tire, complete steering control is still maintained to the other wheel to drive the vehicle because of the independent steering power transmitted to each wheel from steering column 1 through separate shafts 20 and 21. The rotational assembly of piston 70 on steering spindle 36 utilizing bearing 74 permits the combination of a hydraulic type of shock absorber with suspension spring 76 within a cylinder 38 without unduly interfering with or restraining the turning movement of spindle 36. If piston 70 were rigidly mounted on spindle shaft 36 and rotated therewith, not only piston 70 but also heavy compression spring 76 would also rotate with spindle 36. Because of the vehicle weight load acting downwardly through compression spring 76 and thus bearing on piston 70, such an arrangement would offer extreme resistance to the turning of spindle 36, even with an additional bearing supporting the upper end of spring 76. Also, with cylinder 38 filled with oil and utilized as a hydraulic type of shock absorber, the rotation of piston 70 and spring 76 in oil would not only further restrain the turning of spindle 36 and produce undesired turbulence of the oil within cylinder 38, but would also require the use of rotary seals on the periphery of piston 70. Smooth steering action is assured by the gear train operating in oil, and a power boost is given for steering purposes by reason of the favorable gear ratio from steering pinion 10 to steering shaft bevel gears 16 and 18 and from steering shaft pinions 44 to spindle gears 46.

Although I have shown and described my improved steering gear mechanism and shock absorber and suspension apparatus with respect to preferred embodiments thereof, I contemplate that various changes may be made in the size, arrangement and proportions of the various parts without departing from the spirit and scope of my invention as defined by the following claims.

I claim:

1. A shock absorber and suspension assembly for a vehicle comprising:
   an upright, tubular housing adapted to be rigidly secured to the chassis frame of a vehicle;
   a turning spindle shaft extending vertically within said housing and having connecting means at its lower end for attachment to a vehicle wheel, said spindle being supported for rotary movement about its vertical axis and for vertical, shifting movement within said housing:
   a piston positioned transversely within said housing on said spindle shaft for vertical movement therewith relative to said housing, said spindle shaft being rotatably supported within said piston for independent rotary movement with respect thereto;

a load carrying compression spring oriented vertically within said housing and fixedly contained and restrained against rotary movement between one side of said piston and a stationary, transverse wall at one end of said housing;

a shock absorbing means in the form of hydraulic fluid within said housing under said piston; and drive means connected to said spindle shaft for impartin rotary movement thereto from the steering column of a vehicle.

2. A shock absorber and suspension assembly as defined in claim 1 wherein:

the bottom wall of said housing is closed by a transverse wall through which said spindle shaft extends downwardly; and said shock absorbing means comprises said hydraulic fluid within said housing below said piston, the space above said piston within said housing also being filled with hydraulic fluid, said piston including first, valve controlled flow passage means therethrough of relatively large cross-sectional area constructed and arranged to open to permit the flow of said fluid from the chamber above said piston to the chamber therebelow upon the upward movement of said piston relative to said housing, and second flow passage means of relatively smaller cross-sectional area through which said hydraulic fluid flows from the bottom to the top side of said piston upon the downward movement of said piston relative to said housing.

3. A shock absorber and suspension assembly for a vehicle as defined in claim 2 wherein:

said first flow passage means comprises a plurality of passages extending through said piston from the top to the bottom side thereof, the flow of fluid through each of said plurality of passages being controlled by a reed valve flexibly affixed to the underside of said piston and having a permanently open port therein of substantially smaller cross-sectional area than each of said plurality of flow passages and serving as said second flow passage means.

4. A shock absorber and suspension assembly for a vehicle as defined in claim 1 wherein:

said tubular housing has a transverse bottom wall closing its lower end and is filled with hydraulic liquid on the top and bottom sides of said piston; and further including a fluid conduit connecting the space within said tubular housing below said piston with the space in said housing above said piston; and an adjustable valve in said fluid conduit for controlling the flow of hydraulic liquid between the bottom and the top of said tubular housing.

5. A shock absorber and suspension assembly as defined in claim 1 wherein:

said spindle shaft extends upwardly through said transverse wall at the top of said tubular housing and terminates within a relatively small diameter cylinder affixed to the top of said tubular housing and containing therein a second, smaller diameter compression spring resting on the top of said spindle shaft and having its upper end rotatably supported against a bearing at the top of said small diameter cylinder.

6. A shock absorber and suspension assembly as defined in claim 1 wherein:

said compression spring is contained between said piston and the top of said housing, said spring abutting at its lower end against the top side of said piston and at its upper end against said stationary, transverse wall at the top of said housing.

7. A shock absorber for a vehicle comprising:

an upright cylinder having transverse closure walls at its top and bottom ends and containing a hydraulic liquid;

a spindle shaft extending vertically within said cylinder and connected at its lower end to a vehicle wheel, said spindle shaft being supported for vertical, shifting, movement within said housing;

a piston positioned transversely within said cylinder on said spindle shaft for vertical movement therewith relative to said cylinder;

a load carrying compression spring contained within said cylinder between a transverse closure wall of said cylinder and one side of said piston;

valve controlled passage means through said piston contructed and arranged to permit liquid flow from the space within said cylinder above said piston to the space below said piston in response to the upward movement of said piston relative to said cylinder; and a flow conduit connecting the space within said cylinder below said piston with the upper space in said cylinder above said piston, the flow of liquid through said conduit being controlled by an adjustable valve, whereby the flow of liquid from the bottom of said cylinder under said cylinder in response to the downward movement of said piston may be regulated by the adjustment of said valve to give a desired shock absorbing effect.

8. A shock absorber as defined in claim 7, and further including:

second passage means of smaller cross-sectional area than said first passage means communicating the space within said cylinder above said piston with the space within said cylinder below said piston.

9. A shock absorber and suspension assembly for a vehicle comprising:

an upright cylinder adapted to be rigidly secured to the chassis frame of a vehicle;

a turning spindle shaft extending vertically within said cylinder and being supported for rotary movement about its vertical axis and vertical, shifting movement within said cylinder;

a piston disposed transversely within said cylinder on said spindle shaft for vertical movement therewith relative to said cylinder;

a compression spring contained within said cylinder between a transverse wall of said cylinder and one side of said piston;

shock absorbing means within the bottom of said cylinder under said piston;

a lower end portion on said spindle shaft depending downwardly below said cylinder and having an externally threaded, circular base member thereon threadedly received within a substantially circular yoke rigidly secured to the hub of a wheel, said yoke being rotatably adjustable on said threaded base member of said spindle to adjust the alignment of said wheel; and locking means in cooperative engagement with said yoke for holding said yoke in said desired position of rotational adjustment on said threaded base member of said spindle.

10. A shock absorber and suspension assembly as defined in claim 9 wherein:

said locking means comprises a pair of opposed, apertured flanges extending outwardly from said yoke and defining an open side thereof, a locking plate inserted between said flanges and having its inner edge seated within a notch formed in the peripheral surface of said threaded base member of said spindle shaft in alignment with the space between said flanges, and a bolt extending through said apertured flanges and an aligned aperture in said locking plate.

11. A shock absorber and suspension assembly for a vehicle comprising:

an upright cylinder containing a vertically oriented compression spring and a transverse piston therein, said spring bearing at one end against one side of said piston and being contained between said piston and a transverse closure wall of said cylinder;

a spindle shaft extending vertically within said cylinder and having connecting means at its lower end for attachment to a vehicle wheel, said spindle shaft being supported for rotary movement about its vertical axis and vertical, shifting movement with said cylinder, and said piston being carried on said spindle shaft for vertical movement therewith;

shock absorbing means within the bottom of said cylinder under said piston;

drive means connected to the upper end of said spindle shaft for transmitting rotary movement to said spindle shaft from the steering column of a vehicle;

an upright mounting block removably secured to said cylinder by at least one bracket embracing said cylinder, said mounting block having a substantially vertical plate adapted to bear against and be secured to the frame of a vehicle;

and at least one locating pin rigidly attached to and projecting horizontally outwardly from an arcuate wall of said mounting block against which said cylinder is secured by said bracket, said pin being received within a substantially horizontally extending arcuate slot formed within the wall of said cylinder, whereby said cylinder and spindle shaft extending therethrough may be rotatably adjusted about the vertical axis of said cylinder to align a wheel connected to said spindle to compensate for any misalignment in the vehicle frame.

12. A shock absorber and suspension assembly for a vehicle as defined in claim 11, and further including:

at least one arcuate slot in said vertical plate of said mounting block extending in a generally horizontal direction, said slot being constructed and arranged to receive a threaded fastener for securing said vertical plate to the frame of a vehicle, whereby said mounting block and said cylinder assembly may be rotated in a vertical plane about a substantially horizontal axis in order to adjust said cylinder and said spindle shaft to a perfectly vertical position.

13. A steering and suspension assembly for a vehicle comprising in combination:

an upright cylinder adapted to be rigidly secured to the frame of a vehicle;

a turning spindle shaft extending vertically within said cylinder and connected at its lower end to a wheel, said spindle being supported for rotary movement about its vertical axis;

a bevel drive gear connected to the upper end of said spindle by coupling means permitting vertical, shifting movement of said spindle with respect to said drive gear and said cylinder;

a piston positioned transversely within said cylinder on said spindle shaft for vertical movement therewith relative to said cylinder;

a load carrying compression spring oriented vertically within said cylinder and contained between said piston and a transverse closure wall of said cylinder;

shock absorbing means within the bottom of said cylinder under said piston; and a horizontally extending steering shaft rotatably supported at spaced points along its length and having a bevel pinion at one end thereof in driving engagement with said bevel gear connected to said spindle shaft, said steering shaft having a bevel gear at the opposite end thereof in driven engagement with a bevel steering pinion mounted on a steering column extension, said steering pinion and bevel gear being contained within a gear housing into which the free ends of said steering column and horizontal steering shaft extend, and said horizontal steering shaft being enclosed within an elongated housing having a threaded end cap threadedly engaging said housing and forming one wall thereof, the threaded engagement of said end cap with said housing permitting said housing to be rotatably adjusted with respect to said end cap and said horizontal steering shaft, whereby said steering column extension may be angularly positioned for righthand or lefthand steering of a vehicle.

14. A steering and suspension assembly for a vehicle as defined in claim 13 wherein:

said coupling means connecting said bevel drive gear to said spindle shaft comprises a spline connection comprising an elongated tubular member depending downwardly from said bevel gear and having internal splines thereon slidably receiving an external spline section on said spindle shaft; and a relatively small diameter cylindrical housing on top of said cylinder and containing a supplementary compression spring therein of relatively small diameter compared to said load carrying compression spring, the top of said spindle shaft extending upwardly through said splined bevel gear and terminating within said cylindrical housing with the lower end of said small diameter compression spring resting thereon; and a bearing at the upper end of said cylindrical housing against which the upper end of said small diameter compression springs bears, whereby said small diameter compression spring rotates with said spindle shaft.

* * * * *